United States Patent

[11] 3,589,618

[72] Inventors Marvin L. Thornton
 Bayside, N.Y.;
 Charles D. Chambers, Huntington, Conn.;
 Jean Marand, Benoit, France
[21] Appl. No. 814,221
[22] Filed Jan. 28, 1969
[45] Patented June 29, 1971
[73] Assignee Geigy Chemical Corporation
 Ardsley, N.Y.
 Continuation-in-part of application Ser. No. 716,812, Mar. 28, 1968, now abandoned.

[54] PLUG VALVE ASSEMBLY FOR FLUID PRODUCT DISPENSER HAVING RETAINING RING SUPPORTING A PROPELLANT CARTRIDGE
 13 Claims, 8 Drawing Figs.
[52] U.S. Cl. ............................................. 239/307
 222/193
[51] Int. Cl. .............................................. A62c 13/60,
 B67d 5/54
[50] Field of Search ........................................ 222/193;
 239/307, 308

[56] References Cited
 UNITED STATES PATENTS
| 3,389,837 | 6/1968 | Marand | 222/193 |
| 3,401,844 | 9/1968 | Hanson, Jr. | 222/193 |
| 3,425,600 | 2/1969 | Abplanap | 222/193 |
| 3,451,596 | 6/1969 | Marand | 239/308 X |

FOREIGN PATENTS
| 1,494,100 | 7/1967 | France | 239/308 |
| 1,550,968 | 11/1968 | France | 239/307 |

Primary Examiner—Davis T. Moorhead
Attorney—Wenderoth, Lind & Ponack

ABSTRACT: A retaining and sealing ring of a deformed sheet of flexible metal for a plug valve assembly for dispensers of fluid products adapted to be attached to a product container for containing the fluid product to be dispensed. The product container accommodates a propellant cartridge within the product container. The plug valve assembly has a hollow valve stem with a pushbutton actuator on the upper end of said stem which has a nozzle therein communicating with said hollow stem. A cap member fits over a product container and has an aperture therein through which the hollow stem is movable, and a support is secured to the under side of said cap and has a hollow central portion through which said hollow stem is movable. A dip tube is secured in said support and opens into said hollow interior, and a fluid product flow path extends through said hollow stem exteriorly of the hollow thereof from a point adjacent said hollow interior. A first flexible gasket means is positioned in said plug valve assembly through which said hollow stem passes for obturating said fluid product flow path between said fluid product flow path and said hollow interior. The support has a downwardly open recess therein, and a second flexible gasket means is positioned in the bottom of said recess through which said hollow stem passes. The hollow stem has an aperture therein opening into the hollow of the stem, said aperture being obturated by said second flexible gasket means. The retaining ring of the invention is of aluminum or the like and may be deformed during assembly so as to hold said second gasket means in said recess and secured to said support. It has the outer lower edge secured in gastight relationship to a propellant cartridge.

MARVIN L. THORNTON,
CHARLES D. CHAMBERS AND
JEAN MARAND INVENTORS

BY *Wenderoth, Lind & Ponack*

ATTORNEYS

INVENTORS
MARVIN L. THORNTON
CHARLES D. CHAMBERS
JEAN MARAND

BY *Wenderoth, Lind & Ponack*
ATTORNEYS

INVENTORS
MARVIN L. THORNTON,
CHARLES D. CHAMBERS AND
JEAN MARAND

BY *Wenderoth, Lind & Ponack*
ATTORNEY

PLUG VALVE ASSEMBLY FOR FLUID PRODUCT DISPENSER HAVING RETAINING RING SUPPORTING A PROPELLANT CARTRIDGE

This application is a continuation-in-part of our application Ser. No. 716,812, filed Mar. 28, 1968, and now abandoned.

This application relates to a plug valve assembly for dispensers of fluid products in which a high-pressure gasket means in the bottom of the plug valve assembly is held in position by a retaining ring, the retaining ring being of a flexible metal and being secured to the assembly, and a propellant cartridge in gastight relationship to said retaining ring.

There is already known in the art a pushbutton dispenser for dispensing a fluent product constituting an active agent in fractional amounts and in a spray, by means of a propellant gas under pressure held in a propellant cartridge placed inside the product container which contains said fluent product and which is carried on said support, which support is integral with a cover which seals off the aforementioned product container. This integral support and cover contains a high-pressure obturating means for the propellant cartridge and a low-pressure obturating means controlling, respectively, the passage of the product from the container to the pushbutton spray nozzle and the passage of air from the outside to the inside of the product container. A stem which conducts the propellant and the product in the direction of the spray nozzle is slidably mounted in said support and controls the aforementioned obturating means. This dispenser has the high-pressure obturator mounted in the bottom of the support which is held therein by a substantially rigid retaining ring.

The high-pressure obturator is positioned in a recess in the support which opens toward the propellant cartridge, said obturator being held in said recess by means of the retaining ring member which also forms part of the closure for said propellant cartridge. The retaining ring member consists of a separate annular part which is forced into a recess in the support and has a downwardly and outwardly extending portion positioned between the support and the collar of the propellant cartridge. The retaining ring can also be an integral part of the metallic propellant cartridge collar, which can either be secured to an annular flange on the support or cemented or soldered onto said support.

In actual practice, the retaining ring has been made of polyethylene, and it has been found that at elevated temperatures (above 125° F.), the retaining ring distorts slightly, thereby causing leakage. Also, at these elevated temperatures, excessive propellant diffuses through the plastic.

It is an object of the present invention to provide a retaining ring which overcomes these drawbacks, and which provides for a more positive sealing of the propellant cartridge and the plug valve assembly, and at the same time eliminates the distortion of the retaining ring and the diffusion of the propellants.

This objective is accomplished by providing a retaining ring of aluminum or a like metal which holds the high-pressure gasket in the downwardly open recess in the bottom of the plug valve assembly the retaining ring having the lower outer edge secured in gastight relationship to the propellant cartridge, and the retaining ring being deformed so as to resiliently press against the high-pressure gasket in the recess.

Other objects of the present invention will be brought out in the following description and accompanying drawings, in which.

Figure 1:
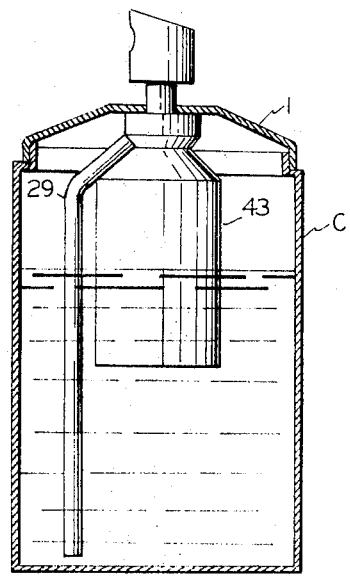
FIG. 1 is a sectional view of a dispenser of the type in which the invention is incorporated.
Figure 2:
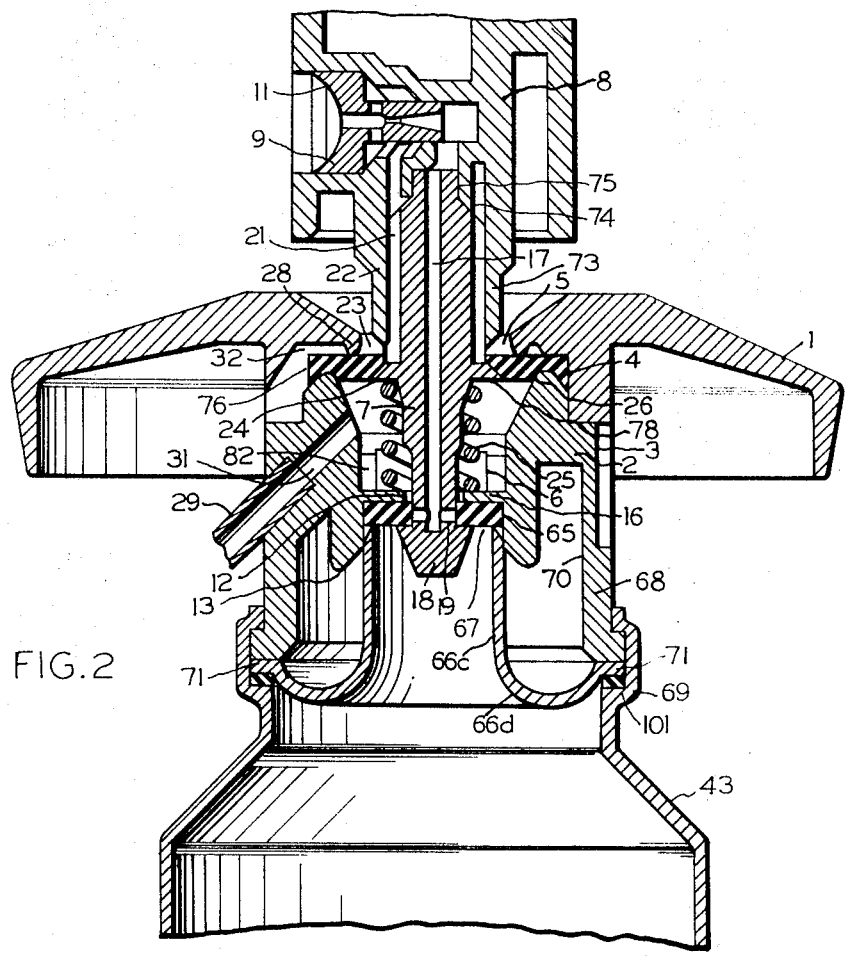
FIG. 2 is an axial sectional view of the upper part of one embodiment of the dispenser according to the invention.

Referring to FIGS. 1 and 2 of the attached drawings, the dispenser comprises a product container C which is adapted to hold a flowable product such as a liquid or a finely divided powder. The product container is closed by a cover 1 from which depends the plug valve assembly. A propellant cartridge 43 depends from the plug valve assembly into the interior of the container C. The cover 1 is made, for example, of plastic material, to which support 2 is attached, these parts mutually abutting each other at a joint 3 where they fit together and hold therebetween a flexible annular low-pressure sealing gasket 4 which is the low-pressure obturator for the active agent and the low-pressure obturator for the admission of air to the product container C from the outside. Parts 1 and 2 may be attached to each other, for example, by ultrasonic welding.

Cover 1 has a central opening 5 and support 2 has an axial valve cup 6 therein, which opening and valve cup are traversed during the axial stroke of valve stem 7 connected to a valve actuator in the form of a pushbutton 8 containing a nozzle insert 9 having a venturi-type spray nozzle therein. Nozzle insert 9 is set into cavity 11 in the head of pushbutton 8. An aperture 12 defined by a shoulder 16 is provided between valve cup 6 and a diverging recess 13 in the base of support 2.

The high-pressure obturator is in the form of an annular flexible gasket 15 mounted in a downwardly opening recess 65 in support 2. The aperture 12 from the valve cup 6 opens into recess 65, which in turn opens into recess 13.

Valve stem 7 is made in one piece, for example, by molding, and has an axial channel 17 with the conical head 18 closing one end thereof. The valve stem 7 extends through aperture 12 to permit the passage of the propellant therethrough. Radial apertures 19 in the wall of valve stem 7 adjacent the head 18 are closed when the valve stem is in the undepressed condition by the flexible lip of gasket 15, the center opening of which is closed by head 18.

Figure 3:
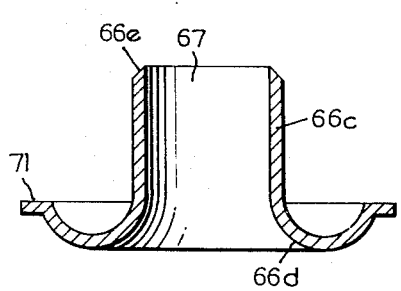
FIG. 3 is a sectional elevation view of the retaining ring used in the dispenser of FIG. 2 prior to its being deformed.
Figure 4:
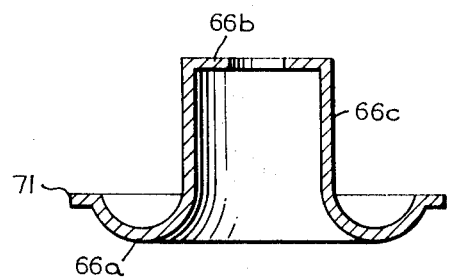
FIG. 4 is a sectional elevation view of an alternative form of retaining ring for use in the dispenser of FIG. 2 prior to its being deformed.

Gasket 15 is held in recess 65 by a retaining ring 66. The latter is an independent member of a flexible, deformable and at least slightly resilient material, preferably metal, such as aluminum, and which has a central generally tubular portion 66c flared downwardly and outwardly in a smooth curve at 66d somewhat in the shape of a horn, as shown in FIG. 3. The tubular portion 66c of the retaining ring has a central hollow 67 through which the cone-shaped head 18 of valve stem 7 extends. The upper edge 66e of the tubular portion 66c can be relatively sharp so as to dig into the gasket 15 slightly. Alternatively, a shoulder 66b can be formed by the bent-over upper edge of the tubular portion 66c, as shown in FIG. 4, which shoulder 66b bears on gasket 15.

A cylindrical cavity 70 is defined at the lower end of support 2 by an annular flange 68. The peripheral edge of the lower end of retaining ring 66 is curved upwardly and outwardly at 66a to a flange 71 seated against the lower edge of annular flange 68. A sealing gasket 101, for example a flowed-in gasket or a preformed ring-shaped gasket of a synthetic rubber material such as Buna-N, a synthetic rubber formed by copolymerization of contour and acrylonitrile sold by I.G. Farben Industries, or Neoprene, a long-chain synthetic rubber made by polymerization of chloroprene, and sold by DuPont, is held between the flange 71 and collar 69 of propellant cartridge 43. The terminal portion of the propellant cartridge is bent so as to fit closely to the contour of annular flange 68, flange 71 and gasket 101, forming a tight joint at the top of the propellant cartridge 43. The retaining ring 66 is made of a material which, in addition to being flexible, deformable and slightly resilient, is also impermeable with respect to the propellant contained in propellant cartridge 43. This prevents leaks as a result of permeability through the material of support 2.

The dispenser is assembled by first mounting the plug valve assembly on the underside of the cover 1, and with the gasket 15 positioned in the recess 65. The retaining ring 66 of the present invention in the form shown in either FIG. 3 or 4 is then positioned between the top of the propellant cartridge 43 and the gasket 15, and the propellant cartridge 43 and the plug valve assembly are moved toward each other so as to deform the retaining ring until it has the shape as shown in FIG. 2 of the drawings. At this point, the collar 69 on the cartridge tightly presses the sealing gasket 101 and the flange 71 between it and the flange 68 on the lower end of the support 2, and with the parts held in this position, the remainder of the collar 69 is bent around the upper edge of the flange 68. This insures the tight holding of the propellant cartridge to the plug valve assembly.

The cover 1 can then be placed on the product container C and the apparatus can be filled in the conventional manner.

A flange 24 on valve stem 7 is urged upwardly by a spring 25 around valve stem 7, and which is positioned between flange 24 and the bottom of cup 6. This spring acts to press the flange 24 upwardly so that the flexible lip of gasket 4 is held between a truncated cone-shaped surface 26 on flange 24, cambered as shown in FIG. 2, and an annular projection 28 around the edge of opening 5 in cover 1. This provides a tight closure of valve cup 6 with respect to opening 5.

Pushbutton 8 which caps valve stem 7 has two coaxial sockets at the base thereof: an outer socket 73 defined by depending wall 22, and which fits tightly around valve stem 7, and an inner socket 74 which receives the tapered end 75 of stem 7. The extent to which sockets 73 and 74 can be forced along valve stem 7 is limited by an annular shoulder 76 at the base of fins 72 defining between them channels 21, along the outside of the stem 17. The channels open out of the stem through apertures 23.

The surface 78 of said flange 24 opposite gasket 4 is straight and serves as a support for spring 25, but this flange 24 also serves as a movable stop for the pushbutton assembly. Fixed radial stops 82 are provided inside cup 6. If pushbutton 8 is pushed in too far, its travel is limited by the contact of surface 78 with stops 82.

Into valve cup 6 opens the upper end of dip tube 29, force-fitted in a bore 31 in support 2 and which is for the passage of the active agent.

When valve stem 7 is in the undepressed position, a tight closure is also insured between opening 5 which communicates with the outside atmosphere as a result of a clearance provided for the sliding movement of the valve stem and the space under the cover 1 which is in communication with the upper surface of gasket 4 through at least one radial channel 32 in the lower face of the downwardly depending portion from cover 1.

When valve stem 7 is in this position, the lip of gasket 15 is pushed by the head 18 of the atomizer against shoulder 16, closing apertures 19 in such a way that a tight closure is insured between aperture 12 and axial channel 17.

Figure 5:
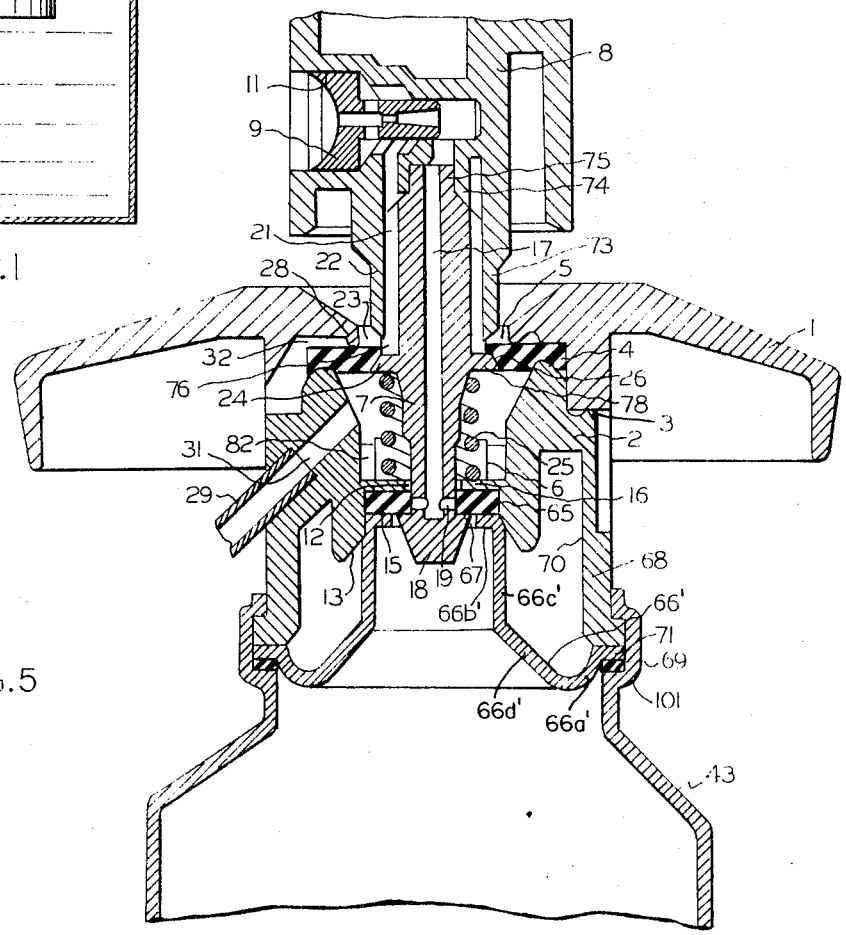
FIG. 5 is an axial sectional view of the upper part of another embodiment of the dispenser according to the present invention.
Figure 6:
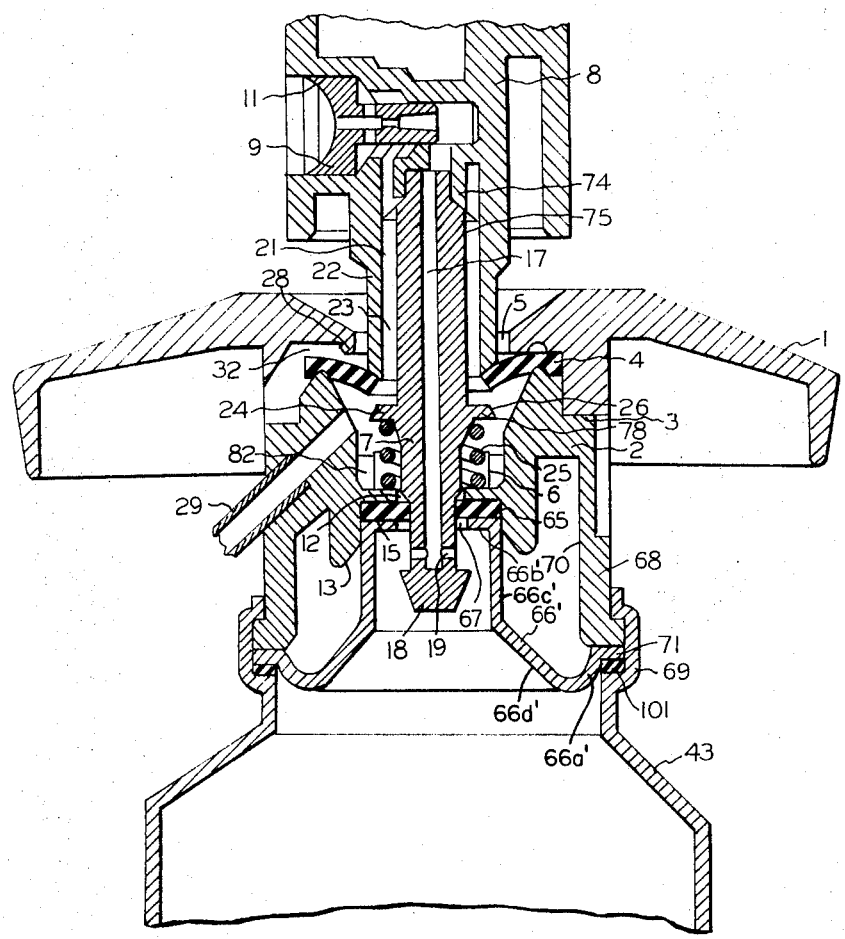
FIG. 6 is a view similar to FIG. 5 showing the parts in the dispensing positions.
Figure 8:
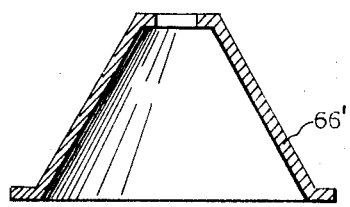
FIG. 8 is a sectional elevation view of the retaining ring used in the modification of FIG. 5 prior to its being deformed into its final shape.

The embodiment of the retaining ring shown in FIGS. 5, 6 and 8 is generally similar to that of FIGS. 2—4, except that in its initial form it has the shape of a truncated cone, shown at 66' in FIG. 8. When it is placed between the top of the propellant cartridge 43 and the gasket 15, and the propellant cartridge 43 and the plug valve assembly are moved toward each other so as to deform the ring 66', the ring assumes the shape as shown in FIGS. 5 and 6, having a central generally tubular portion 66c' which is angled downwardly and outwardly along a generally conical portion 66d' and then upwardly and outwardly at 66a' to the flange 71'. The shoulder 66b' is also provided in this embodiment.

Figure 7:
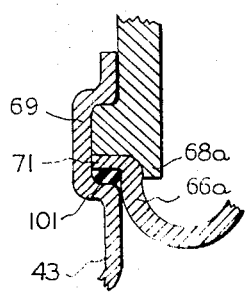
FIG. 7 is a fragmentary sectional view showing a modification of the structure of the device.

In order to insure tight engagement of the flange 71 with the sealing gasket 101, the lower edge of the flange 68 can be modified as shown in FIG. 7. The flange 68 is provided with a downwardly extending projection 68a on the inner edge thereof, which, when the flange 71 is held in the collar 69 of the cartridge 43, presses against the downwardly extending portion 66a of the retaining ring 66 adjacent the flange.

It will, therefore, be seen that there has been provided a retaining ring which can be easily fabricated and assembled in the container and plug valve assembly, and which provides a positive seal between the plug valve assembly and the propellant cartridge. Being of metal, it is not subject to distortion at high temperature, and is impermeable to the propellant.

In addition, it should be pointed out that the provision of this separate ring makes possible the easy insertion into the propellant cartridge prior to the assembly thereof with the plug valve assembly of any materials which it is desired to have in the propellant cartridge, such as a means for enhancing the activity of the propellant or a dip tube for the propellant. Such means could not be easily inserted into the propellant cartridge if the retaining ring were formed as an extension of the wall of the propellant cartridge.

It is thought that the invention and its advantages will be understood from the foregoing description, and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What I claim is:

1. In a plug valve assembly for dispensers of fluid products adapted to be attached to a product container for containing the fluid product to be dispensed and adapted to accommodate a propellant cartridge with the product container, said plug valve assembly having a hollow valve stem, a pushbutton actuator on the upper end of said stem and having a nozzle therein communicating with said hollow stem, a cap member adapted to fit over a product container and having an aperture therein through which the hollow stem is movable, a support secured to the under side of said cap and having a hollow central portion through which said hollow stem is movable, a dip tube secured in said support and opening into said hollow interior, a fluid product flow path through said hollow stem exteriorly of the hollow thereof from a point adjacent said hollow interior, a first flexible gasket means in said assembly through which said hollow stem passes obturating said fluid product flow path between said fluid product flow path and said hollow interior, said support having a downwardly open recess therein, a second flexible gasket means in the bottom of said recess through which said hollow stem passes, said hollow stem having an aperture therein opening into the hollow of the stem, said aperture being obturated by said second flexible gasket means, and a propellant cartridge secured on the support opposed to the downwardly open recess, that improvement comprising a retaining ring of a flexible, deformable and at least slightly resilient material, said retaining ring being a separate piece from said cartridge and having a tubular portion extending generally downwardly and then flaring outwardly, the upper end of said tubular portion being engaged only with said second flexible gasket and constituting the only means holding said gasket in said recess, the flared portion having an outwardly extending flange therearound in tight engagement with said cartridge, said retaining ring being fixed in position between said second flexible gasket and said cartridge and being deformed and resiliently acting against said second flexible gasket at all times.

2. The improvement as claimed in claim 1 in which there is a sealing means between said retaining ring and said cartridge.

3. The improvement as claimed in claim 1 in which said retaining ring is flared downwardly and outwardly in a smooth curve somewhat in the shape of a horn.

4. The improvement as claimed in claim 1 in which said retaining ring is flared downwardly and outwardly generally in the shape of a truncated cone.

5. The improvement as claimed in claim 1 in which said support has a downwardly depending flange thereon defining a cylindrical cavity on the bottom of said support, said cartridge having a collar thereon fitted tightly over the lower edge of said flange and holding the lower edge of said retaining ring between said cartridge and the lower edge of said flange in a gastight engagement.

6. The improvement as claimed in claim 5 in which the flange on the retaining ring extends outwardly and the retaining ring extends downwardly from the inner edge of the flange and then curves upwardly toward the upper end thereof and said downwardly depending flange has a downwardly extending projection on the inner edge thereof in tight engagement with the downwardly extending portion of the retaining ring adjacent said flange for holding the flange in tight engagement with said cartridge.

7. The improvement as claimed in claim 1 in which said retaining ring has a relatively sharp upper end digging into said gasket.

8. The improvement as claimed in claim 1 in which the retaining ring has a bent over shoulder at the upper end thereof in engagement with said gasket.

9. A retaining ring for positioning between the top of a container and a stem obturating gasket in an aerosol-type dispenser, said ring comprising a generally tubular upper portion, a downwardly and outwardly flaring portion on the lower end of said tubular portion, an upwardly and outwardly curved portion on the end of said flaring portion, and an outwardly extending flange on the end of said upwardly and outwardly curved portion.

10. A retaining ring as claimed in claim 9 in which said downwardly and outwardly flaring portion is smoothly curved.

11. A retaining ring as claimed in claim 9 in which said downwardly and outwardly flaring portion is in the form of a truncated cone.

12. A retaining ring as claimed in claim 9 in which the upper end of said tubular portion is relatively sharp.

13. A retaining ring as claimed in claim 9 in which the upper end of said retaining ring has a bent over shoulder thereon.